Jan. 10, 1961    J. HOVORKA    2,967,508
LOW PRESSURE ALARM FOR PNEUMATIC TIRES
Filed May 21, 1958    3 Sheets-Sheet 1

INVENTOR
JIRI HOVORKA
BY
ATTORNEY

Jan. 10, 1961 J. HOVORKA 2,967,508
LOW PRESSURE ALARM FOR PNEUMATIC TIRES
Filed May 21, 1958 3 Sheets-Sheet 2
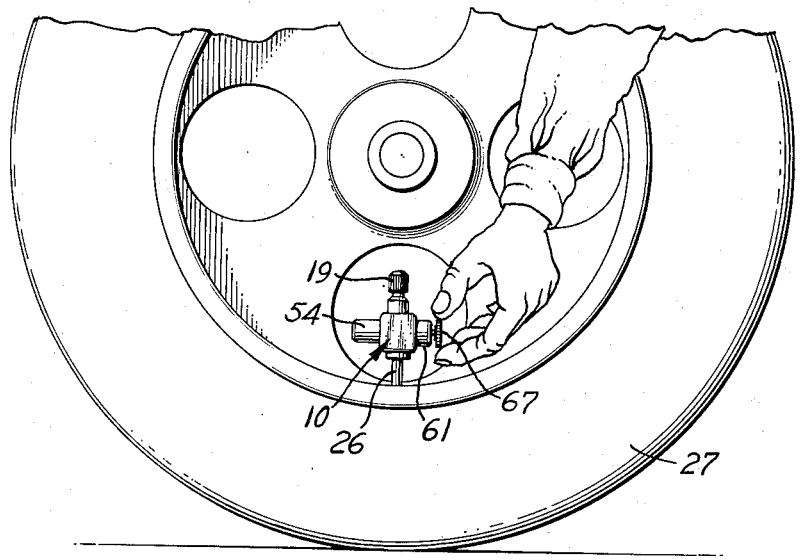
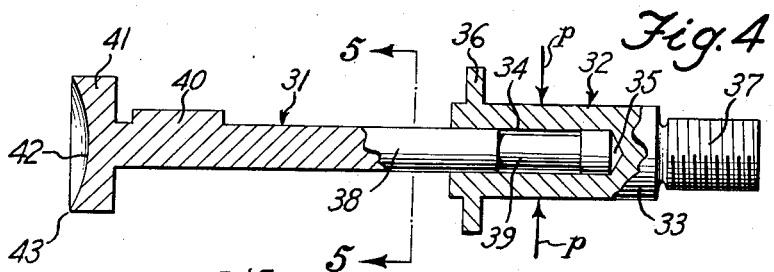
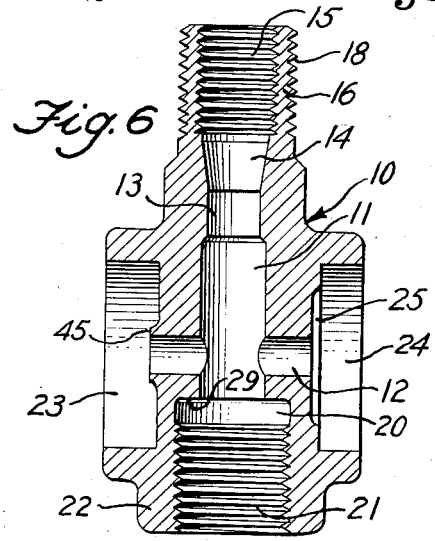
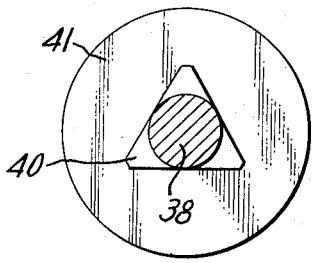
INVENTOR
JIRI HOVORKA
BY B. P. Fishburne, Jr.
ATTORNEY

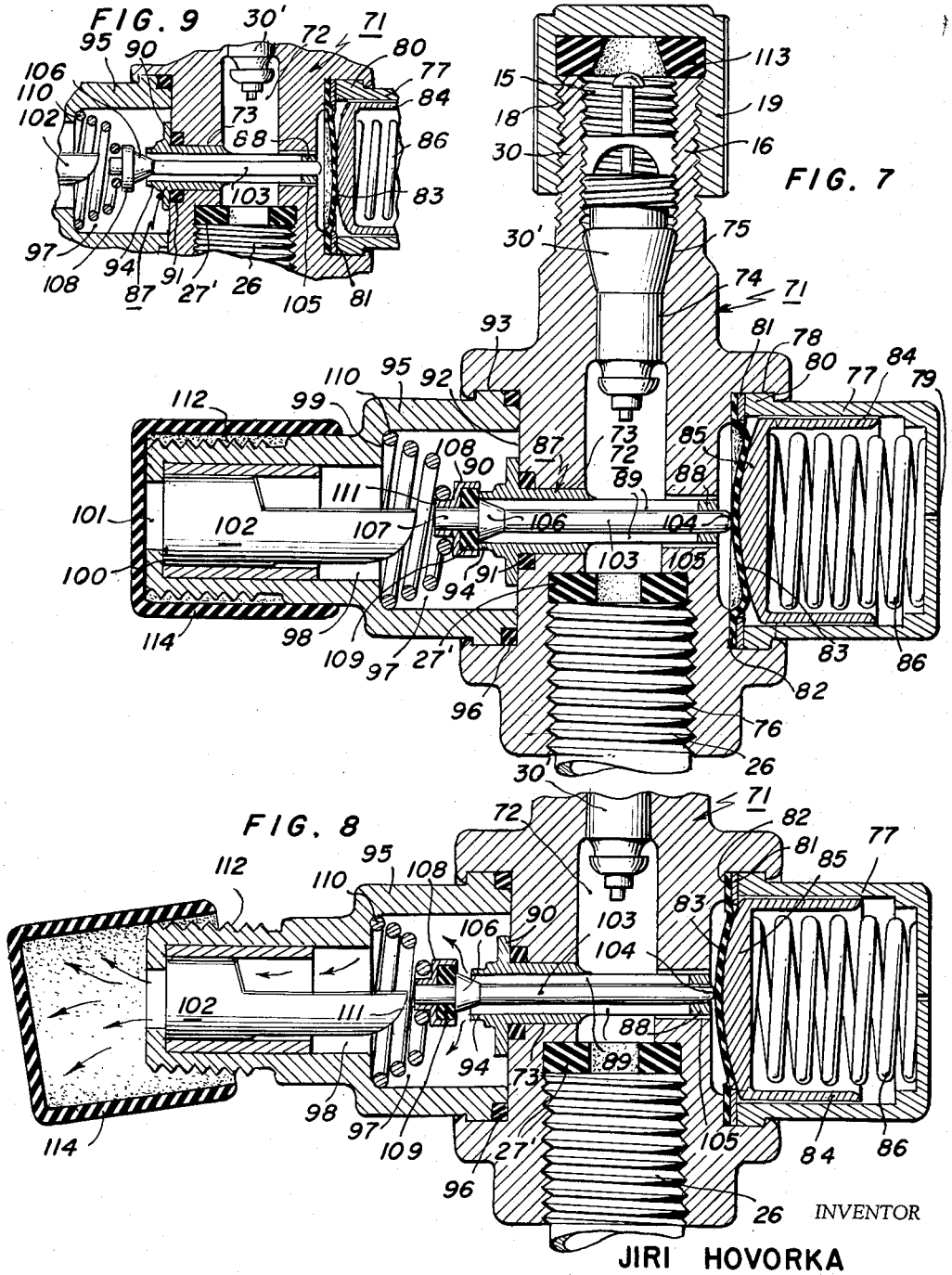

United States Patent Office 2,967,508
Patented Jan. 10, 1961

2,967,508

LOW PRESSURE ALARM FOR PNEUMATIC TIRES

Jiri Hovorka, Maplewood, N.J., assignor to Tire Safety Inc., Cape May, N.J., a corporation of New Jersey Filed May 21, 1958, Ser. No. 736,897

5 Claims. (Cl. 116—34)

The present invention relates to a low pressure alarm for pneumatic tires.

This application is a continuation-in-part of my prior co-pending application Serial Number 679,940, filed Aug. 23, 1957, for Low Pressure Alarm for Pneumatic Tires, now abandoned.

A primary object of the invention is to provide an alarm for the pneumatic tires of automotive vehicles, which will produce an audible signal whenever the pneumatic tire pressure drops a predetermined distance below the pressure which it is desired to maintain in the pneumatic tire.

A further object of the invention is to provide an alarm device which is in the nature of an attachment for any conventional pneumatic tire, the device being highly simplified in construction, reliable and efficient in operation, inexpensive to manufacture, and adding no appreciable weight to the tire at its point of application thereon.

A further important object is to provide a pneumatic tire alarm which is readily attachable to the standard screw-threaded valve stem of any conventional automotive pneumatic tire, without the necessity of altering the construction of the tire or valve stem in any way.

A further object is to provide a low pressure tire alarm of the above-mentioned character which permits the inflation of the tire in the usual manner.

Another object is to provide in an alarm device of the above-mentioned character means for stopping the operation of the alarm, after the alarm begins to operate, so that no further air from within the tire will be lost through the alarm device once it has served its purpose of signaling the operator that the tire pressure is below the desired degree.

Still another object of the invention is to provide a tire alarm device of the above-mentioned character which is highly compact in design, and having a novel mode of assembly and mode of operation, the alarm device including a spring which may be calibrated for rendering the device operative in response to substantially any tire pressure or change in tire pressure found desirable.

A further object of the invention is to provide a low pressure alarm device for pneumatic tires, which in one embodiment of the invention includes novel and simplified means to bleed air from the pneumatic tire, in the event that the same is over-inflated, or has its air pressure increased excessively, as during driving at high speed on a hot pavement.

Another object is to provide a low pressure alarm device for pneumatic tires, including an automatic high pressure bleed means which operates in conjunction with the low pressure alarm actuating means, and without interfering with the normal operation of the latter.

Other objects and advantages of the invention will be apparent during the course of the following description.

In the accompanying drawings, forming a part of this application, and in which like numerals are employed to designate like parts throughout the same.

Figure 3 is a fragmentary side elevation of a pneumatic tired wheel having the alarm device applied thereto, the latter being shown exaggerated in size for the purpose of illustration.

Figure 4 is an enlarged central vertical section through a valve pin and bushing assembly removed.

Figure 5 is an enlarged transverse vertical section taken on line 5—5 of Figure 4.

Figure 6 is a central vertical section through a valve body or casing embodied in the alarm device.

Figure 7 is a greatly enlarged central vertical section through a low pressure alarm device with high pressure bleed means, in accordance with a further embodiment of the invention, and showing the same in a normal or inactive condition, as where the tire is inflated with proper air pressure.

Figure 8 is a fragmentary central vertical section, similar to Figure 7, and showing the alarm device in the active condition for indicating that the pressure in the tire is below the desired level.

Figure 9 is a further fragmentary central vertical section similar to Figures 7 and 8, on a reduced scale, and illustrating the condition of the device when air is being bled from the tire because of overinflation.

Figure 1:
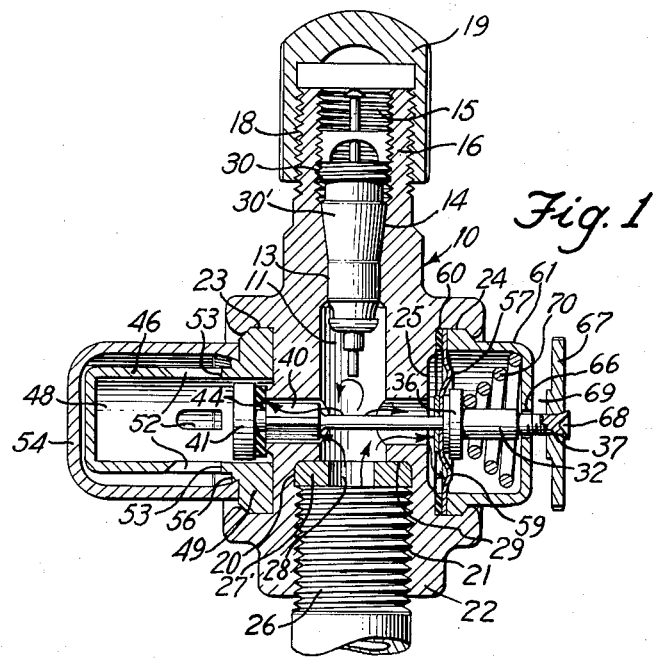
Figure 1 is a central vertical section on a greatly enlarged scale through the low pressure alarm device embodying the present invention, and showing the same in a normal or inactive condition.

In the drawings, wherein for the purpose of illustration are shown preferred embodiments of the invention, attention is directed first to Figures 1 to 6 inclusive, wherein the numeral 10 designates generally a valve body or casing having a central longitudinal bore 11 and a transverse bore 12 arranged at right angles to the bore 11 and intersecting the same centrally of the valve body 10. The longitudinal bore 11 has one end leading to a somewhat reduced cylindrical bore portion 13, in turn opening into an outwardly flaring conically tapered bore portion 14. The tapered bore portion 14 leads to and communicates with an internally screw-threaded bore 15, which opens through the adjacent tubular end portion 16 of the valve body 10. The tubular end portion 16 of the valve body is externally screw-threaded at 18, for the reception of a standard valve stem cap 19, as shown.

The other end of the longitudinal bore 11 opens into an enlarged cylindrical recess 20, concentric therewith, and this recess 20 leads to an internally screw-threaded bore or opening 21, which opens through the adjacent tubular end portion 22 of the valve body 10. The several longitudinal bores and bore portions above-described are in axial alignment and concentric with the main longitudinal bore 11.

At one side of the valve body 10, the same is provided with an enlarged cylindrical recess 23, concentric with and in communication with the transverse bore 12 of the valve body, prior to the assembly of the alarm device. The opposite side of the valve body 10 is provided with a somewhat similar enlarged cylindrical recess 24, concentric with and in communication with the opposite end of the transverse bore 12. At the inner end or bottom of the recess 24, the valve body is further provided with a shallow reduced recess 25, as indicated.

In assembly, the screw-threaded bore 21 of the valve body 10 receives the standard screw-threaded valve stem 26 of the pneumatic tire 27 to which the alarm device is applied, and the entire alarm device is bodily supported by the valve stem 26. A lead gasket or washer 27' having a bore 28 is disposed within the recess 20, inwardly of the valve stem 26, and seated against a shoulder 29, formed at the juncture of the recess 20 and bore 11. The lead gasket 27' is compressed by the inner end of the valve stem 26 to afford an air tight seal between the latter and the valve casing 10. Disposed within the tapered bore portion 14 and the cylindrical bore portion 13 of the valve casing is a standard pneumatic tire air check valve 30', such as commonly employed in all automotive pneumatic tires to facilitate introducing air into the tires and for retaining the air therein. This check valve 30' has its inner end communicating with the longitudinal bore 11, and its outer end communicating with the internally screw-threaded bore 15, within which it has screw-threaded engagement at 30.

Reference is now made to Figure 4 of the drawings, which shows an assembly of a valve or whistle pin 31 with a bushing 32. The bushing 32 has a cylindrical body portion 33 having a central axial bore 34 formed therein and opening through one end thereof. The bore 34 has its other end 35 terminating somewhat short of the corresponding end of the body portion 33, as shown in Figure 4. Near the end of the bushing 32 through which the bore 34 opens, the same is provided with an enlarged annular flange 36, integral therewith. The opposite end of the bushing 32 carries a reduced screw-threaded extension 37, also formed integral therewith.

The valve or whistle pin 31 includes an elongated cylindrical stem portion 38, engageable within the bore 34 of the bushing 32, with its end engaging the inner end 35 of such bore. Within the bore 34, the stem 38 has an undercut portion 39, and the whistle pin 31 is permanently secured within the bushing 32 by pinching or squeezing the bushing at opposed points P thereon adjacent to the undercut portion 39 of the stem 38. This securely locks the pin 31 and bushing 32 together in assembly.

The whistle pin 31 further includes a relatively short stem portion 40, preferably triangular in cross section, as shown in Figure 5. If desired, the stem portion 40 may be formed square in cross section, or any other desired polygonal shape which will provide a flat face or faces upon the same. The end of the pin 31 remote from the bushing 32 carries an enlarged cylindrical whistle head 41, integral therewith, and provided in its outer face with a spherically curved recess 42, providing a sharp marginal annular edge 43 upon the head 41, at the outer side thereof. The sharp edge 43 coacts in the assembly with other parts of the device, to be described, for producing the whistle, as will be more apparent as the description proceeds.

Figure 2:
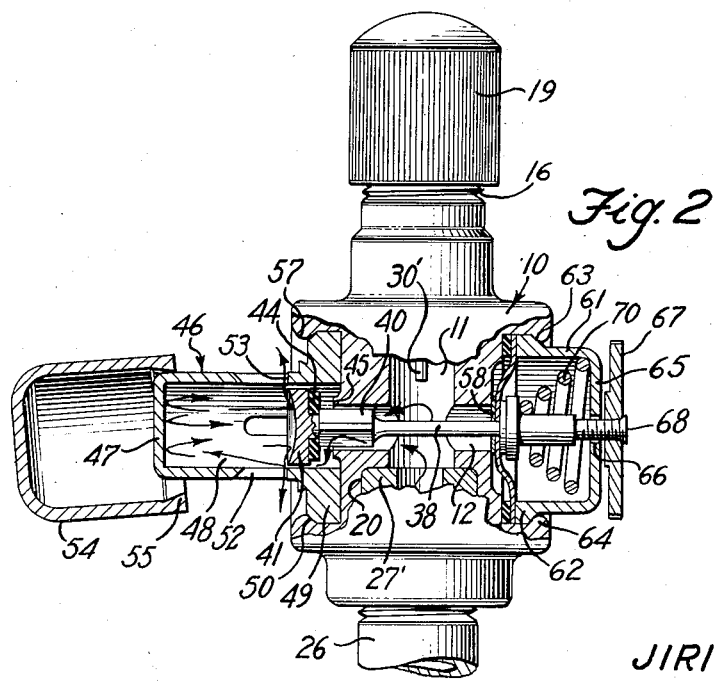
Figure 2 is a further central vertical section through the device, similar to Figure 1, and showing the alarm in the active position for indicating that the pressure in the tire has dropped below the desired level, parts broken away and parts in elevation.

In the assembled alarm device, as shown by Figures 1 and 2, the elements 31 and 32 shown in Figure 4 extend transversely of the valve body 10 and longitudinally of the transverse bore 12. More specifically, the slender stem portion 38 is received by the transverse bore 12, and the stem 38 is of considerably smaller diameter than the bore 12, as clearly shown in Figures 1 and 2. The triangular stem portion 40 likewise engages within one portion or section of the bore 12, and preferably has a smooth sliding fit therein. A natural or synthetic rubber gasket 44 surrounds the portion of the shank 38 between the inner side of the head 41 and the adjacent end of the triangular stem portion 40. The gasket 44 is adapted to seat against the flat end face 45 of a boss formed upon the valve body 10 at the adjacent end of the transverse bore 12.

A cylindrical whistle cap or bushing 46 is provided, including a closed outer end wall 47, and having a cylindrical bore 48, of slightly larger diameter than the diameter of the head 41. The head 41 and gasket 44 are adapted to be received within the bore 48 of the whistle cap and to have limited axial movement therein, as shown. The bore 48 opens through the inner end of the whistle cap 46, remote from the closed end wall 47. At its inner end, the whistle cap 46 has an enlarged annular flange 49, integral therewith, and snugly received within the enlarged recess 23 of the valve body 10. The flange 49 preferably has a marginal beveled face 50, engaged by a bead 51, formed at one side of the valve body 10 by rolling the same with a suitable tool about the outer end of the recess 23. By this means, the whistle cap 46 is rigidly and permanently secured within the recess 23 and locked therein in a firm manner.

Just outwardly of the bead 51 and the adjacent side of the valve body 10, the whistle cap 46 is provided with the desired number of circumferentially spaced whistle slots 52, which slots are formed through the side wall of the cap 46, so as to provide sharp edges 53 for coaction with the sharp edge 43 of the head 41 to produce the whistle, as will be further described. The several slots 52 of the whistle cap are all in alignment circumferentially of the cap. Two or more of the slots 52 may be employed, as shown, and any number of the slots found desirable may be used, including one slot, if preferred.

A blow-off cap or cover 54, formed of synthetic rubber or the like, is provided and this cover surrounds and encloses the whistle cap 46, outwardly of its flange 49. The cover 54 is provided adjacent to its inner open end with a thickened portion or bead 55, engageable over a flared projection or flange 56, formed near the inner end of the whistle cap 46. The purpose of the cover 54 is solely to protect the whistle cap 46 and associated elements from dirt, and the like, and upon operation of the whistle, to be described, the cover 54 is blown off as indicated in Figure 2, and is, in fact, an expendable item.

A resilient diaphragm 57 of Phosphor bronze or like material, is received within the valve casing recess 24, and has a central opening, snugly receiving the stem 38 of whistle pin 31. The central portion of the outer face of diaphragm 57 engages against the inner flat end of the bushing 32, and a suitable flat washer 58, slightly larger than the bore 12, is also mounted upon the stem 38, just inwardly of the diaphragm 57, and in engagement with the inner face thereof. The flat washer 58 and central portion of the diaphragm 57 are permanently secured to the stem 38 and to the inner end of the bushing 32 with soft solder, so as to form an air tight connection between the diaphragm 57, bushing 32 and stem 38. The inner side of the flat washer 58 is adapted to be seated against the bottom of the shallow recess 25.

When the diaphragm 57 is in the normal or relaxed condition, Figure 1, it contains a single annular wave or corrugation 59, outwardly of and surrounding the flange 36 of the bushing 32. The periphery of the diaphragm 57 is disposed close to the side wall of the bore 24, and a gasket 60 of natural or synthetic rubber or the like is interposed between the peripheral portion of the diaphragm 57 and the bottom of the enlarged recess 24, in order to provide an air tight seal at the periphery of the diaphragm.

A preferably stainless steel cup 61 has its inner enlarged flange 62 received within the recess 24, outwardly of the peripheral portion of the diaphragm 57, and the flange 62 preferably has an outer beveled face 63 engaged by a bead 64, formed upon the adjacent side of the casing 10 by rolling the same with a suitable tool adjacent to the outer open end of the recess 24. By this means, the cup 61 is permanently secured within the recess 24 in tight clamping engagement with the peripheral portion of the diaphragm 57. The diaphragm in turn has tight clamping engagement against the gasket 60, and an air tight seal is afforded at the periphery of the diaphragm so that air cannot escape therearound. It may now be seen that the diaphragm 57 interconnects the relatively stationary valve casing 10 and the movable assembly comprising the whistle pin 31, bushing 32 and associated elements.

The outer end wall 65 of the cup 61 has a central opening 66 formed therethrough, movably receiving with clearance the reduced screw-threaded extension 37 of the bushing 32. Outwardly of the cup 61, the screw-threaded extension 37 carries an adjusting nut 67, which is preferably substantially flat in construction and provided with a knurled edge to facilitate turning. The endmost threads 68 of the extension 37 are preferably deformed to prevent separation of the nut 67 from the extension 37. The nut however is freely turnable upon the screw-threaded extension 37 for adjusting the nut inwardly toward the cup 61. The nut is normally adjusted outwardly to the extreme end of the extension 37, and in this position, a clearance space 69 is provided between the nut and cup 61, which space is greater than the distance traveled by the elements 31 and 32 and associated parts during the operation of the low pressure alarm device.

Mounted within the cup 61 and surrounding the bushing 32 is a calibrated coil spring 70, having its outer end engaging the end wall 65 of the cup 61 and its inner end engaging the flange 36 of the bushing 32, as shown.

*Operation*

To apply the alarm device to the pneumatic tire 27 shown in Figure 3, the usual valve stem cap is removed from the screw-threaded valve stem 26, and the air check valve corresponding to the check valve 30' is removed from the valve stem 26. The completely assembled alarm device shown in Figure 1 is now applied to the screw-threaded valve stem 26 and the lead gasket 27' is compressed to prevent the escape of air around the valve stem 26. The adjusting nut 67 is adjusted outwardly to the extreme end of the screw-threaded extension 37, as shown in Figure 1, and the alarm device is ready for operation.

The desired amount of air is readily introduced into the pneumatic tire by simply removing the cap 19 and applying air through the conventional check valve 30' in the usual manner. The air passes through the check valve 30' and through the bore 11 directly into the valve stem 26 leading to the tire. The operation of filling the tire with air is exactly the same as that performed for filling any conventional automotive tire with air. After the air is introduced into the tire, the cap 19 may be replaced upon the threaded portion 18 of the body or casing 10.

The spring 70 is calibrated to cause the device to produce a shrill whistle whenever the pressure within the tire drops below a predetermined desired level, and in this connection the tire pressure at which the device will produce the signal or alarm may be substantially any desired pressure, depending upon the size and calibration of the spring 70. The spring constantly urges the whistle assembly including the elements 31 and 32 and the associated diaphragm 57 to the left, Figures 1 and 2, thus tending to unseat the gasket 44 in the manner shown in Figure 2.

However, as long as the predetermined desired air pressure is maintained within the tire 27, this air under pressure will act against the inner side of the diaphragm 57, Figure 1, and against the spring 70 to maintain the gasket 44 seated tightly against the flat face 45 for maintaining an air tight seal therewith. It will be observed that the exposed area of the diaphragm 57 is relatively large, compared to the exposed area of the gasket 44, and the air under pressure within the tire will readily act upon the diaphragm 57 and hold the gasket 44 seated against the face 45. In this condition, and while the desired air pressure is maintained in the tire 27, no air can escape past the gasket 44 or around the diaphragm 57 or through the check valve 30', and the air pressure is maintained within the tire as desired.

When the air pressure inside of the tire 27 drops for any reason, for example due to some damage to the tire during operation, and when the air pressure reaches a predetermined level below the pressure which it is desired to maintain within the tire, the calibrated spring 70 will overcome the effect of air pressure upon the diaphragm 57, and will shift the assembly composed of the elements 31 and 32 and associated parts to the left, Figure 2, for unseating the rubber gasket 44. As previously stated, the spring 70 may be calibrated or sized to cause the unseating of the gasket 44 at substantially any desired pressure below that pressure which it is desired to maintain within the tire.

The diaphragm 57 will yield toward the left, Figure 2, to permit the described unseating of the gasket 44, and the wave or corrugation 59 of the diaphragm will now become flattened to provide the desired movement of the diaphragm without stretching the latter or destroying its resiliency.

The movement of the whistle pin 31, bushing 32 and associated elements to the left, Figure 2, under the influence of the spring 70, is limited by contact of the flat washer 58 with the bottom of the shallow recess 25. It will be observed in Figure 2, that when this condition is reached, the sharp edge 43 of the whistle head 41 is exactly opposite the edges 53 of the whistle slots 52. When this condition is reached, the air from the tire passes through the stem 26 and into the bore 11 and the bore 12, and the air continues to flow in the direction of the arrows in Figure 2, through the several spaces or passages afforded by the flat faces of the triangular stem portion 40 within the bore 12. The air now escapes around the gasket 44 and head 41 within the bore of the whistle cap 46, and the air continues to flow toward the outer end wall 47 of the whistle cap and has its direction reversed as indicated by the arrows in Figure 2, so that the air flows inwardly toward the head 41 and spherical recess 42. The inwardly flowing air impinges against the spherical recess 42, and is deflected radially outwardly and across the knife-like edge 43 of the head 41 and also across the several edges 53 of the whistle slots 52. This action of the air in flowing across the aligned sharp edges 43 and 53 produces an extremely shrill audible whistle which is readily heard by the driver of the vehicle.

Simultaneously with the unseating of the gasket 44, and the flow of air under pressure into the whistle cap 46, the cover 54 is blown off of the whistle cap to permit the passage of air through the whistle slots 52. As previously stated, the purpose of the cover 54 is solely to protect the whistle cap and associated elements from dirt, and the cover 54 is expendable.

When the operator hears the audible signal or whistle, he may immediately stop the vehicle, realizing that one of his tires is losing air. In order to prevent the tire from continuing to lose air through the whistle mechanism, it is merely necessary for the operator to turn the adjusting nut 67 inwardly toward contact with the cup 61. This action will immediately return the whistle assembly including the pin 31, bushing 32 and associated elements to their normal positions shown in Figure 1, and the gasket 44 will again be seated upon the face or shoulder 45 in an air tight manner. This effectively prevents the escape of further air from the tire beyond the gasket 44 and through the whistle slots 52. The driver of the vehicle knowing that the tire is losing pressure due to damage, may now proceed to a repair station while some air pressure still remains within the tire, and with the knowledge that tire trouble of some sort exists.

It is thus seen that I have provided a novel and simplified low pressure pneumatic tire alarm which will produce an audible signal heard by the driver of the vehicle whenever the air pressure within the tire equipped with the device drops below a desired predetermined level. As described above, means are also provided to manually render the whistle inoperative, so that further loss of air through the whistle can be prevented, while the driver is proceeding to a repair station.

I wish to emphasize that the entire device is extremely small and lightweight in actual construction, and the parts have been drawn on a greatly exaggerated scale throughout, for the purpose of clarity. In practice, the entire device need weigh no more than one or two ounces, so that its effect upon the balance of the tire 27 may be readily offset by the application thereto of the usual lead weights at a point upon the tire diametrically opposite to the alarm device.

The device is highly simplified and compact in construction, reliable and efficient in operation, and readily appliable to any conventional pneumatic tire by the mere removal of the standard valve cap and the application of the body or casing 10 to the valve stem of the tire.

Reference is now made to Figures 7 through 9, wherein there is shown a further embodiment of the invention, which includes in addition to the low pressure alarm means, an automatic high pressure bleed means for relieving the tire of excess air pressure, caused by overinflation when the tire is filled with air, or due to driving at high speed upon a hot pavement, or the like.

In Figures 7 to 9, a valve body or casing 71, substantially identical to the casing 10, is provided. The casing 71 has a central longitudinal bore 72 and a transverse bore 73 extending at right angles to the bore 72 and intersecting the same within the valve casing, as shown. The longitudinal bore 72 has a reduced portion 74, leading to an outwardly flaring conically tapered bore portion 75.

The conventional pneumatic tire air check valve 30' referred to in the first form of the invention is mounted within the bore portions 74 and 75, and the construction of the device as shown in Figure 7 outwardly of the check valve 30' may be identical to the corresponding construction shown and described in connection with the prior form of the invention, see Figure 1. In view of this, a further detailed description of the part of the device adjacent to the check valve 30' is deemed to be unnecessary, and the same reference numerals applied to these parts in Figures 1 through 6 have been applied again in Figure 7 to the corresponding parts adjacent to the check valve 30'.

The tire valve stem 26 referred to in the prior form of the invention has screw-threaded engagement at 76 within an enlarged internally screw-threaded bore or opening, formed in the adjacent end of the casing 71, and leading to the longitudinal bore 72, as shown. The gasket 27' described in the prior form of the invention is employed, and the construction of the lower end of the device adjacent to the tire valve stem 26 may be identical to the corresponding construction described in the prior form of the invention.

A preferably stainless steel cup 77, corresponding to the cup 61 in the prior form of the invention, is similarly fixedly mounted within a recess 78 formed in the adjacent side of the valve casing 71, and communicating with one outer end of the transverse bore 73. The cup 77 is closed except for a small vent opening 79 in its outer end. The inner flange 80 of the cup is seated upon a rigid flat washer 81, in turn bearing against the flat marginal portion 82 of a resilient diaphragm 83, having its central portion formed concave inwardly, as shown. The diaphragm 83 is preferably formed of synthetic rubber or the like, reinforced with fabric, such as nylon. If preferred, a diaphragm formed of metal or other suitable material may be employed. An air tight joint is formed around the marginal portion 82 of the diaphragm 83, by the clamping action of the washer 81 and the cup 77.

A cylindrical cup-like spring retainer 84 is movably mounted within the cup 77 and has a convex inner end 85 to fit the concave portion of the diaphragm 83 as shown in the drawings. A calibrated compressible coil spring 86 is held captive within the retainer 84 and the cup 77, and the inner end of this spring bears against the inner end 85 of the retainer 84, and its outer end bears against the outer end of the cup 77. The spring 86 serves to urge the diaphragm 83 inwardly longitudinally of the bore 73.

A bushing or guide 87 is fixedly mounted within the transverse bore 73 and extends across the longitudinal bore 72 and has a short cylindrical tubular portion 88 disposed within the bore 73, adjacent to the inner side of recess 78. The bushing 87 is slotted or open throughout a major portion of its length, adjacent to the bore 72, as indicated at 89. By this arrangement, air from the tire valve stem 26 flowing into the longitudinal bore 72 may pass through the slots 89 into the bore of the bushing 87 as indicated in Figure 8. The bushing 87 has a flat annular flange 90 formed thereon near one end thereof for sealing engagement with a suitable gasket 91, held within a recess in the valve casing 71 surrounding the bushing. The flange 90 may also bear against the flat surface 92 of a recess 93 in the adjacent side of the casing 71, which recess 93 corresponds to the recess 23 in the prior form of the invention. Outwardly of the flange 90, bushing 87 carries an integral tubular extension 94, the outer end of which constitutes an annular valve seat.

A tubular cap 95 is fixedly mounted within the recess 93 of casing 71 in a manner similar to the mounting of the whistle cap 46 within the recess 23 in the prior form of the invention. A suitable gasket 96 forms an air tight seal between the cap 95 and the casing 71. The tubular extension 94 of bushing 87 extends into an enlarged chamber 97 of the cap 95, which chamber leads to a reduced bore 98 of the cap 95, there being a shoulder 99 formed between the chamber 97 and bore 98. A second shoulder 100 is formed at the outer end of the cap 95 by a further reduced opening 101 at the outer end of the cap. A conventional alarm whistle element 102 is fixedly mounted within the bore 98 of cap 95, and the outer end of this whistle may engage the shoulder 100 as indicated.

An elongated pin or valve stem 103 extends through the bore of bushing 87, in concentrically spaced relation thereto, and one end of the pin 103 has sliding guided engagement within the annular portion 88 of the bushing 87. The adjacent end of the pin 103 is rounded at 104 for smooth engagement with the convex face of diaphragm 83. A small annular clearance space 105 is provided between the bushing portion 88 and the adjacent section of the bore 73, so that air may flow from the longitudinal bore 72 outwardly toward the diaphragm 83.

Near the opposite end of the pin 103, the same is provided with an enlarged conical head 106, normally disposed within the bore of the bushing 87, and outwardly of this head 106, the pin 103 has a reduced cylindrical extension 107 formed integral therewith. Surrounding and mounted upon the extension 107 is a metal retainer cup 108 for a rubber valve ring or element 109, which is adapted to seat against the end of the tubular extension 94 on the bushing 87 to form an air tight seal therewith. The valve ring 109 also engages the outer end of the conical head 106, as shown. A cone-shaped calibrated compressible coil spring 110 is contained within the chamber 97, and has one end bearing against the shoulder 99, and its other reduced end engaging about a neck 111 on the cup 108. The reduced end of the spring 110 bears directly on the outer end of the cup 108, to urge the rubber valve element 109 toward closed or sealing engagement with the tubular valve seat 94. The cone-shaped spring 110 maintains the cup 108 and valve element 109 centered with respect to the bushing 87, and the guide portion 88 of the bushing maintains the opposite end of the pin or stem 103 centered. The conical head 106 of the pin 103 also aids in centering the pin within the bushing 87 when the parts are arranged as shown in Figure 7. The entire pin or valve stem 103 is axially movable within the bushing 87 during the operation of the devices, as will be further described.

The outer end portion of tubular cap 95 is externally screw-threaded at 112 to receive the conventional valve cap 19, when the latter is removed from the extension 16 of the valve casing 71. The purpose of this is to enable the user of the device to get out of the vehicle and remove the cap 19 and place the same upon the screw-threaded extension 112, when air is flowing out of the tire, due to the operation of the low pressure tire alarm or whistle. The placement of the cap 19 upon the screw-threaded extension 112 will immediately stop the loss of air from the tire, and enable the driver to reach a repair station with the vehicle before too much air is lost from the tire. The cap 19, Figure 7, contains a gasket 113 to form an air tight seal with the end of the cap 95 when applied thereto.

A blow-off cap 114, similar to the cap 54 in the first form of the invention, is normally applied over the outer end of the cap 95, and when the low pressure whistle is operating, the air pressure built up within the cap 114 causes it to be automatically blown off of the cap 95 as illustrated in Figure 8, to permit the escape of air through the whistle. This will also occur when excessive air pressure is being bled from the tire by the device, in a manner presently to be described.

*Operation*

The operation of the embodiment shown in Figures 7 to 9, when normal or correct air pressure is maintained within the tire, is such that all parts will be arranged as shown in Figure 7. Normal air pressure within the tire is also present within the longitudinal bore 72, and this normal tire pressure is acting upon the diaphragm 83, through the passage 105, and the diaphragm 83 is held out of engagement, or at least exerting no pushing force against the valve stem 103. The calibrated spring 110 is now urging the rubber valve element 109 into sealing engagement with its seat 94, and air cannot escape through the bore of the bushing 87 into the chamber 97 to operate the whistle 102.

In the event that the tire is leaking and the air pressure within the tire drops below the proper range, the air pressure within the bore 72 and against the diaphragm 83 will likewise drop, and the coil spring 86 will overcome the pressure of the diaphragm 83 and shift the diaphragm to the left, Figure 8, which movement shifts the valve stem 103 to the left and unseats the rubber valve element 109. Air from the tire now escapes through the bore of the bushing 87 and passes into the chamber 87 and through the whistle 102 to operate the same for sounding a warning to the driver that a particular tire is losing air pressure. The driver will now stop the vehicle and place the cap 19 upon the screw-threaded extension 112, and this will stop the escape of air through the whistle and enable the driver to drive to a repair station before too much air is lost from the tire. The spring 110 will of course yield as shown in Figure 8 under the influence of the other spring 86 to permit the valve element 109 to open when air pressure in the tire drops below the desired level.

In the event that the tire is overinflated or gains air pressure as when traveling at high speed upon a hot pavement, excess air pressure will be bled by the device automatically from the tire. With reference to Figure 9, whenever the air pressure within the bore 72 becomes excessive, the diaphragm 83 is forced to the right or away from the valve stem 103, and the spring 86 is compressed. The high air pressure within the bore of bushing 87 acts upon the inner side of the rubber valve element 109 and unseats the same slightly by compressing the conical spring 110, which is a much lighter spring than the spring 86. By this means, the dangerous excessive tire pressure is automatically bled from the tire by the automatic opening of the valve element 109. Due to the smaller effective area of the valve element 109 adjacent to the bore of the bushing 87, the excessive air pressure in the bore of the bushing 87 may only open the valve element 109 a slight amount, and although this is fully effective for bleeding the excess pressure from the tire, the whistle 102 will not be sounded as in the case where the tire pressure falls below the desired level. This is a desirable feature, because it is not necessary to warn the driver when the excess air pressure is being bled from the tire, as it is necessary when the tire pressure falls below the desired limits. The action of bleeding excess air pressure from the tire is thus fully automatic, and whenever the tire becomes overinflated, the pressure will be automatically reduced by the device to the proper level.

It is thus seen, in Figures 7 to 9, that I have provided a combined low pressure alarm device and automatic high pressure bleed for pneumatic tires. The construction and operation of the device is simple and foolproof, and the two springs 86 and 110 coact with the diaphragm 83 and valve stem 103 to render the device fully automatic for sounding an audible alarm whenever the tire pressure drops below desirable limits and for bleeding excess tire pressure from the tire. A significant difference between the two embodiments of the invention, aside from the provision of the extra spring 110, is that the valve stem 103, Figures 7 to 9, is not positively connected or attached to the diaphragm 83, in the manner that the stem 38, in the prior form of the invention, is attached to the diaphragm 57.

All other parts and their operation is identical to that of the corresponding parts shown and described in the first form of the invention.

It might be mentioned in connection with both forms of the invention, Figures 1 and 2 and Figures 7 to 9, that during the initial inflation of the tire, the operator may hold the rubber cap 54 or 114 on the device with his hand so that air will not escape through the whistle structure, while the tire pressure is building up to the normal amount. However, even if the air is allowed to escape through the whistle structure while the tire is being initially inflated, this will do no harm, and the whistle will quickly stop operating because the flow of air into the tire through the check valve 30' is much greater than the flow which can escape through the whistle structure in either form of the invention, and as soon as the air pressure within the tire increases sufficiently to shift the diaphragm 57 or 83 to the right, the valves 44 or 109 will be closed for stopping the whistle. Additionally, in Figures 1 and 2, if preferred, the valve 44 could be closed by means of the nut 67 during the initial inflation of the tire and the tire could be inflated to the desired pressure in the usual manner.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described the invention, I claim:

1. A low pressure alarm device for pneumatic tires comprising a body portion adapted to be applied to the valve stem of a conventional pneumatic tire, said body portion having passage means communicating directly with said valve stem, an air check valve positioned within the passage means to normally prevent the escape of air from said tire and to facilitate filling the tire with air in the conventional manner, said body portion having additional passage means substantially at right angles to the first-named passage means, a reciprocatory valve element disposed within the second-named passage means, a resilient diaphragm associated with said valve element and adapted to shift the valve element toward an open position when the air pressure acting upon the diaphragm drops below normal desired tire pressure, a spring associated with said diaphragm and urging the diaphragm in a direction opposite to that in which it is urged by the air pressure within the tire, and overcoming the action of the diaphragm and shifting the valve element to its open position when the air pressure within the tire drops below the normal range, a whistle producing element carried by said body portion near said valve element, and a spring engaging the valve element in opposition to the first-named spring and aiding in maintaining the valve element in closed position when the tire contains normal air pressure but adapted to yield and permit opening of the valve element when excessive air pressure is developed in the tire and thereby allowing such excessive air pressure to be bled off.

2. A low pressure alarm device for pneumatic tires comprising a body portion adapted to be bodily mounted upon the valve stem of a conventional tire, said body portion having passage means communicating with said valve stem, a check valve mounted within the passage means to prevent the escape of air from the tire and to facilitate inflating the tire, said body portion having additional passage means substantially at right angles to the first-named passage means, a reciprocatory valve adapted to close one end of the second-named passage means and having a stem extending through the second-named passage means, a first spring engaging said valve and opposing opening of the valve, a diaphragm mounted upon the body portion near the second-named passage means and adapted to engage the end of said stem remote from said first spring, a second spring associated with said diaphragm and urging the diaphragm toward contact with said stem and tending to shift the valve to the open position against the force of the first spring, and an air flow operated sound producing device carried by said body portion near said valve for producing a sound when said valve is opened due to a drop in tire air pressure, normal air pressure within said tire acting upon said diaphragm and preventing the diaphragm from opening said valve and a drop in tire air pressure causing said diaphragm under the influence of the second spring to open said valve.

3. A low pressure alarm and high pressure bleed device for pneumatic tires comprising a body portion adapted to be bodily mounted upon the valve stem of the pneumatic tire, said body portion having first passage means communicating with said valve stem, said body portion having second passage means substantially at right angles to the first passage means and communicating therewith, a reciprocatory valve element adapted to cover one end of the second passage means and to prevent the escape of air therefrom and having a stem projecting through the second passage means, a first spring engaging said valve element and tending to close the same, a diaphragm mounted upon said body portion near the other end of the second passage means and adapted to engage the adjacent end of said stem but free from attachment htereto, a second spring associated with said diaphragm and urging the diaphragm toward engagement with said stem and tending to open said valve element, said diaphragm being exposed on one side to the air pressure within said first and second passage means, and a whistle element carried by said body portion near said valve element and adapted to produce a whistle when the valve element opens due to air pressure in the tire dropping below a normal level, excessive air pressure within the tire acting upon said diaphragm to shift it away from engagement with said stem and causing said valve element to open against the action of said first spring to permit the escape of air through said second passage means.

4. A combined low pressure alarm and high pressure bleed device for pneumatic tires comprising a body portion adapted to be bodily mounted upon the valve stem of a conventional tire, said body portion having first and second intersecting passages communicating with said tire valve stem, a check valve mounted within said first passage to prevent the escape of air from the tire and to facilitate inflating the tire, a guide bushing mounted within the second passage and having a side opening communicating with the first passage and including a part near one end of the second passage forming a valve seat, a valve element to engage the valve seat for preventing the escape of air from the second passage, an elongated stem secured to the valve element and extending through said guide bushing and being guided thereby and having a free end, a diaphragm mounted upon said body portion near the end of the guide bushing remote from said valve seat and adapted to engage the free end of said stem, a cup element secured to the body portion outwardly of said diaphragm, a spring retainer movably mounted within said cup element and engaging said diaphragm, a spring disposed within said cup element and engaging said spring retainer and cup element and urging the spring retainer and diaphragm toward the free end of said stem, a tubular cap secured to said body portion at its side opposite to said cup element and adjacent to the valve element and having a chamber receiving the valve element, a spring disposed within said chamber of the tubular cap and engaging the valve element to maintain the same in engagement with said valve seat, and a whistle producing element mounted within said tubular cap outwardly of said chamber and adapted to produce a whistle when the valve element is unseated by the first-named spring and diaphragm due to a drop in air pressure within the tire, excessively elevated air pressure within the tire acting upon said valve element to unseat the same against the action of the second-named spring and permitting the excessive air pressure to be bled from the tire.

5. A low pressure alarm device for pneumatic tires comprising a body portion having a screw-threaded opening to receive the valve stem of a conventional tire, said body portion having a first passage means leading from and communicating with said screw-threaded opening and a second passage means crossing and communicating with the first passage means of the body portion, a check valve mounted within the first passage means to facilitate inflating the tire and to retain the air within the tire, a guide bushing secured within the second passage means and having a part forming a valve seat near one end of the second passage means, a valve element engageable with the valve seat, an elongated stem secured to the valve element and extending through the guide bushing and second passage means, the guide bushing having an opening placing the bore of the guide bushing in communication with the first passage means, a whistle unit mounted upon the body portion adjacent to one end of the second passage means and adjacent to the valve element, a first spring associated with the whistle unit and connected with the valve element and tending to maintain the valve element seated, a resilient diaphragm mounted upon the body portion near the opposite end of the second passage means and engageable with the adjacent end of said stem, and a second spring associated with said body portion and connected with said diaphragm and urging the diaphragm into engagement with said adjacent end of the valve stem, said diaphragm being free from positive attachment to the valve stem.

References Cited in the file of this patent

UNITED STATES PATENTS

| 1,151,044 | Relyea | Aug. 24, 1915 |
| 1,297,239 | Potter | Mar. 11, 1919 |
| 1,424,278 | Brown | Aug. 1, 1922 |
| 1,453,657 | Brown | May 1, 1923 |
| 1,486,010 | Brown | Mar. 4, 1924 |